(12) United States Patent
Niemeyer, III (10) Patent No.: US 9,121,781 B2
(45) Date of Patent: Sep. 1, 2015

(54) FORCE GAUGE FOR PLIABLE MATERIAL (71) Applicant: Compression Matters Corporation, Las Vegas, NV (US)

(72) Inventor: Robert Henry Niemeyer, III, Tigard, OH (US)

(73) Assignee: Compression Matters Corporation, Las Vegas, NV (US)

( * ) Notice: Subject to any disclaimer, the term of this patent is extended or adjusted under 35 U.S.C. 154(b) by 0 days.

(21) Appl. No.: 13/852,858

(22) Filed: Mar. 28, 2013

(65) Prior Publication Data

US 2013/0263679 A1 Oct. 10, 2013

Related U.S. Application Data (60) Provisional application No. 61/616,788, filed on Mar. 28, 2012.

(51) Int. Cl.
*G01L 1/04* (2006.01)
*G01L 1/22* (2006.01)

(52) U.S. Cl.
CPC ............... *G01L 1/04* (2013.01); *G01L 1/2231* (2013.01)

(58) Field of Classification Search
USPC .................................................... 73/862.636
See application file for complete search history.

(56) References Cited

U.S. PATENT DOCUMENTS

| 2,278,416 | A | 4/1942 | Atti |
| 2,694,535 | A | 11/1954 | Atti |
| 3,130,382 | A | 4/1964 | Laimins |
| 3,269,174 | A | 8/1966 | Linville |
| 3,608,370 | A | 9/1971 | Vollenweider et al. |
| 3,665,757 | A | 5/1972 | Hoag |
| 4,089,036 | A * | 5/1978 | Geronime ................... 361/283.2 |
| 4,102,210 | A * | 7/1978 | Couston et al. ................ 73/727 |
| 4,166,997 | A | 9/1979 | Kistler |
| 4,555,028 | A | 11/1985 | Valehrach |
| 5,179,861 | A * | 1/1993 | Asano et al. .................... 73/726 |
| 5,524,491 | A | 6/1996 | Cavalloni |
| 6,196,073 | B1 | 3/2001 | Harding |
| 6,755,085 | B1 | 6/2004 | Kazanjian et al. |
| 6,804,988 | B2 | 10/2004 | McNamara et al. |
| 7,210,362 | B2 | 5/2007 | Tsutaya |
| 7,343,223 | B2 | 3/2008 | Miura et al. |
| 7,777,871 | B2 | 8/2010 | McNamara et al. |
| 8,146,435 | B1 | 4/2012 | Li et al. |
| 8,171,799 | B2 | 5/2012 | Rebeaud |
| 8,256,306 | B1 | 9/2012 | Bauer et al. |
| 2004/0083825 | A1 | 5/2004 | Tsutaya |
| 2005/0066741 | A1 | 3/2005 | O'Brien et al. |
| 2009/0120201 | A1 | 5/2009 | Mendoza |

OTHER PUBLICATIONS

European Patent Office, "International Search Report for PCT/US2013/034453", Dec. 10, 2013, Publisher: WIPO.

* cited by examiner

*Primary Examiner* — Lisa Caputo
*Assistant Examiner* — Octavia Hollington
(74) *Attorney, Agent, or Firm* — Fellers, Snider, Blankenship, Bailey & Tippens, P.C.

(57) ABSTRACT

A force gauge assembly used to measure forces or spring rate of an object utilizing a diaphragm strain gauge for mechanically compensating for loads not being centrally applied to the gauge. The construction of the gauge provides readings that will be substantially the same as if the load were applied in perfect alignment. The gauge utilizes internal components that remain the same even though the force gauge is adaptable for measuring different objects.

28 Claims, 8 Drawing Sheets

Fig. 1

Prior Art

Fig. 16

FORCE GAUGE FOR PLIABLE MATERIAL

CROSS REFERENCE TO RELATED APPLICATIONS

This application claims the priority of U.S. Provisional Patent Application No. 61/616,788 entitled "FORCE GAUGE FOR PLIABLE MATERIAL," filed Mar. 28, 2012, the contents of which are hereby incorporated by reference.

FIELD OF THE INVENTION

This invention relates to a device that is used to find the force necessary to measure the compression of pliable materials such as foam rubber or solid rubber or spherical materials such as fruit, soles for athletic shoes, or balls used in sports such as a golf ball or tennis ball or measure to trailer tongue weight or other application.

BACKGROUND OF THE INVENTION

Devices having strain gauges for converting an applied force or load into electrical signals are known the art. Such a device is structured so that the applied force or load deforms one more strain gauges. The strain gauges convert the deformation (i.e., strain) into electrical signals. The output is typically processed using an algorithm to calculate the force or load being applied to the device.

A force or multiple forces applied to an object to be measured may be converted into a compression scale. For the purposes of this discussion, "Compression" or "Compression Scale" will be defined as force per unit deflection that can be expressed as a "Spring Rate" or function of a spring rate that may be available via a look up table or mathematical formula. An example of a well-known compression scale is one used to designate golf ball hardness.

Figure 1:
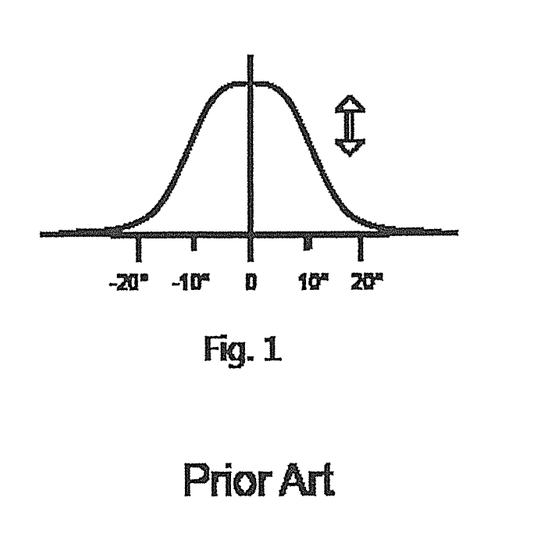
FIG. 1 is a graphical representation of a force gauge measurement at different angles of force application.

One problem with known load gauges is that an application of force that is not centered on the strain gauge, or that is delivered at an angle to the surface of the strain gauge produces errors in the measurement provided by the strain gauge. As an example, FIG. 1 graphically shows how an accurate reading may only be made at a force delivering angle of 0, i.e., normal, when any departure from normal, results in a degradation of the force measured.

SUMMARY OF THE INVENTION

The strain gauge assembly of the invention is used to accurately measure the force of a flat or non-flat surface that may be used to derive a spring rate of an object. An example device that could employ the strain gauge of the invention is described in U.S. publication 2012/0166106, incorporated herein by reference.

The rings of the diaphragm strain gauge of the invention are designed to mechanically compensate for loads not being applied exactly in the center of the gauge. While a toggle foot may be used to ensure that the measured surface is in full contact with the gauge, if the force being applied is off center by a small amount, the reading will be the same as if it were in perfect alignment by using the diaphragm strain gauge.

The force gauge utilizes internal components that will remain substantially the same even though the force gauge is adapted for measuring different objects. The gauge may be adapted by varying the thickness of the bottom of cup to accommodate a selected range of forces and by affixing a variety of interface members or energy directors to impart force on the bottom surface of cup.

The strain gauge assembly of the invention includes a housing having a wall area and a lower portion, wherein the wall area and lower portion defining a cavity or cup-like structure. The lower portion of the housing has an internal surface that defines a bottom of the cavity. In one embodiment, the cavity of the invention retains same size and shape for all configurations of the gauge. The housing further defines a flange and a keying mechanism for preventing rotation of the housing within a suitable mounting structure.

A stem extends from an external surface of the lower portion. The stem provides a uniform load to a center of the lower portion of the housing to provide strain to the lower portion.

An interface member is affixed to a distal end of the stem. The interface member may be integrally formed with the stem, may be rigidly affixed to the stem, or may be hingedly or otherwise flexibly attached, as discussed below. The interface member is provided for contacting an object to be measured, such as a ball or fruit or other material to be tested. A width of the interface member may vary in size and concavity to accommodate different shapes of the objects to be measured. In one embodiment, the interface member is mounted on a toggle foot for tracking a surface area position of the object, wherein the toggle foot and strain gauge together combine to accurately read force even when there is misalignment or off-center stress of the gauge's center on the compressed object.

A support member is received within the cavity. The support member has an upper surface and a lower surface.

A strain gauge element is affixed to the internal surface of the lower portion of the housing, preferably with an adhesive, to allow the strain gauge element to measure strain imparted to the lower portion. The strain gauge element has a circle portion and a surrounding zig-zag portion. The circle portion defines ring segments that substantially form complete circles, e.g., wherein the ring segment traverse greater than 350 degrees. A diameter of the circle portion preferably is 60% to 70% of the diameter of the strain gauge element, more preferably the diameter of the circle portion comprises 60% of the diameter of the strain gauge element.

An interface circuit is provided on the upper surface of the support member for electronic interface with the strain gauge element. Data processing components are located on the upper surface of the support member. The data processing components are in electronic communication with the interface circuit for processing data collected from the strain gauge element. The data processing components are placed in close proximity to the strain gauge element to minimize electrical noise and interference;

An output conduit in communication with the data processing components is provided for for transmitting information from the data processing components. A potting compound is received within the cavity for protecting and securing the support member and attached strain gauge element therein, so that the strain gauge element is potted into the bottom of a cup or cavity.

The strain gauge element is located on an interior surface of a lower portion of the housing. An appropriately sized interface element is selected for securing to a stem extending from an external surface lower portion of the housing. An object to be measured is positioned adjacent to the interface element. The object is then compressed so that the interface element and attached stem bend the lower portion of the housing. When a force for compressing the object is centered on the interface element, the zig-zag portion of the strain gauge element is bent the same on opposite sides of the strain gauge element and the center portion is deflected uniformly. However, when a force for compressing the object is off-center, the lower portion is distorted wherein the strain gauge element experiences higher stress on a first side and lower stress on a second side. In particular, the circle portion experiences the different stresses so that the stresses are canceled out to "mechanically" average the deformation of strain gauge circles about a center of the gauge.

An example force range for the gauge is 0 to 500 pounds, which can be measured in accuracies of grams or milligrams. All operations of assembly and manufacturing are substantially identical. Cost will, therefore, be similar for all forms of gauges manufactured.

One object of this invention is to provide an electronic gauge that can be used under different configurations to find a force required to measure the "spring rate" of a wide variety of objects of various materials, such as balls used in sports or of fruits and vegetables, with a very high degree of accuracy and repeatability.

A further object of this invention is to provide a device that will assist in the measurement of "spring rate" to a very high degree of accuracy and repeatability, wherein the device has no deflection or minimal deflection such that the contribution to the measurement is so small that further consideration in not required.

A further object of the invention is to provide a gauge that can be traced to absolute standards, such as traceable scale, e.g. to measure commodities or shipping weight.

A further object of this invention is to provide a device that will assist in the creation of defined scales that relate the "spring rate" of an object of various materials, such as a ball, or fruit, to another scale that is normally used to describe such things to members of a particular industry.

A further object of this invention is to provide a gauge that will assist in the creation of compact and light-weight measurement devices that can be carried with little effort.

A further object of this invention is to provide a gauge that will not damage or mark the surface of an object to be measured, such as a ball or fruit, through the use of custom shapes for contact surfaces of an interface member.

A further object of this invention is to provide a gauge that uses largely the same set of internal components for all configuration of the gauge.

For the purpose of the disclosure, the conversion of "spring rate" to "compression scale" may vary from one ball type to another or from one fruit or vegetable to another. For example, the spring rate for a golf ball wherein most golf balls vary from 1100 pounds per inch to 3000 pounds per inch and can be expressed to one familiar to the game of golf as a "compression scale" of 30 to 120 respectfully.

A further example is that the "compression scale" of a tomato that may vary from ½ pounds per inch for a ripe tomato to three pounds per inch for a tomato that needs to stay on the vine to further ripen. As an example, the "compression scale" for a tomato could be set by those familiar to growth and sale of tomatoes as a range from one to ten.

As a further application, the device of the invention may be useful to help identify concussions. Concussions present concerns related to player safety in football and many other sports, as well as with military personnel. While the spring rate in a golf ball is measured in terms of pounds force, the gauge of the invention can measure much smaller forces, i.e., deflection change based upon change in milligrams or grams of force. It is believed that the gauge of the invention may be used to measure pressure changes within a human skull, i.e., may be used to measure intra-cranial pressure. The pressure measurements may then be used to identify concussions when measured against an "at-rest" baseline. Further, measurement may be taken across two time points immediately after a hard hit was sustained, e.g., during an athletic competition. Examples of time points may be 1 or 5 minute interval measurements taken post trauma to detect swelling.

DETAILED DESCRIPTION OF THE PREFERRED EMBODIMENTS

Figure 2:
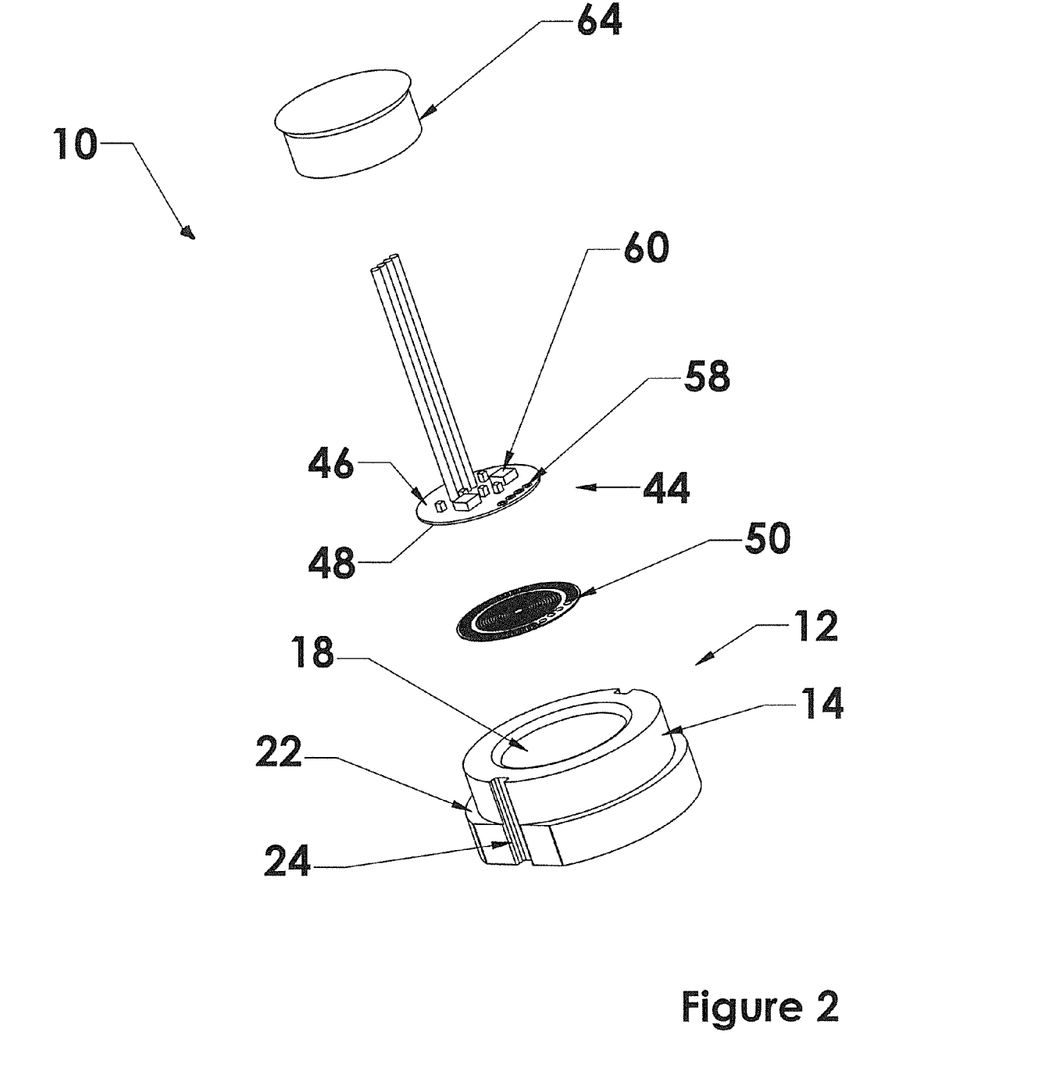
FIG. 2 shows an isometric exploded view of the gauge assembly of the invention.

Strain gauge assembly 10 of the invention includes a housing 12 having a wall area 14 and a lower portion 16 that defines a cavity 18. Lower portion 16 defines an internal surface 20 wherein internal surface 20 defines a bottom of cavity 18. In a preferred embodiment, cavity 18 remains the same size and shape for any of the various configurations of gauge assembly 10. The shape of housing 12 is preferably constructed such that wall area 14 is very rigid, which forces the bottom of the cup, or lower portion 16, to take all of the strain when force is applied to external surface 28 of lower portion 16. With all of the strain being experienced by lower portion 16, the only part that needs to change shape to make different force ranges for strain gauge assembly 10 is the thickness of the bottom of the cup, i.e., the thickness of lower portion 16. This thickness can be easily varied for multiple applications. For example, a 0.050 inch thickness of lower portion 16 is desirable for use in a gauge for measuring 0 to 50 pounds, when a lower portion 16 of 0.1" could measure 0 to 500.

Wall area 14 of housing 12 further defines a flange 22 and a keying mechanism 24 for preventing rotation of housing 12 within a suitable mounting structure. Stem 26 protrudes from an external surface 28 of lower portion 16. External surface 28 defines an annular recess 27 from which stem 26 protrudes. Annular recess 27 functions as an energy director in the center face lower portion 16 of stress gauge assembly 10. Annular recess 27 preferably comprises a depth of between 25 and 30 percent of the thickness of lower portion 16. Annular recess 27 causes strain to occur in the center of lower portion 16 of strain gauge element 50 that is affixed to internal surface 20 of the bottom of the cup, i.e., of lower portion 16.

Stem 26 provides a uniform load to a center of lower portion 16 of housing 12 to provide strain to lower portion 16.

Figure 4:
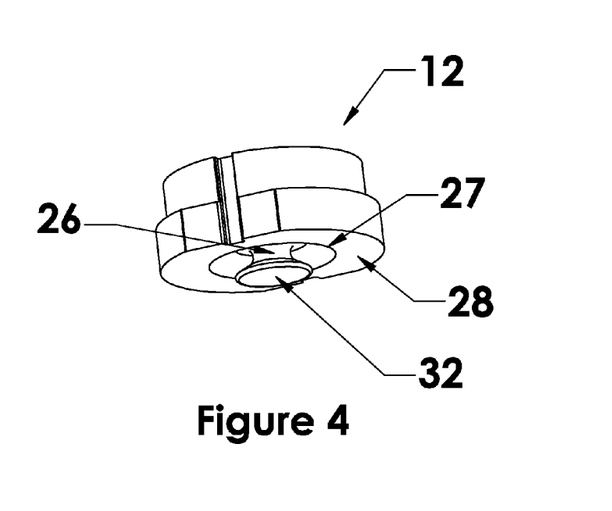
FIG. 4 shows an assembled isometric view of the gauge assembly of FIG. 2, wherein the gauge assembly is provided with a small interface.
Figure 5:
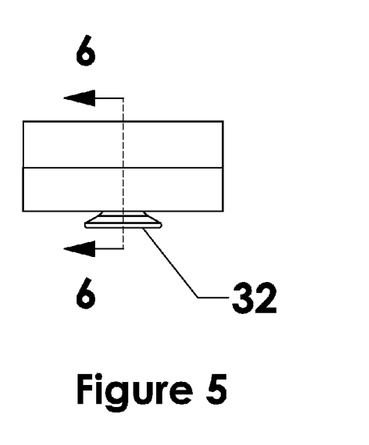
FIG. 5 shows a plan view of the gauge assembly of FIG. 4.
Figure 6:
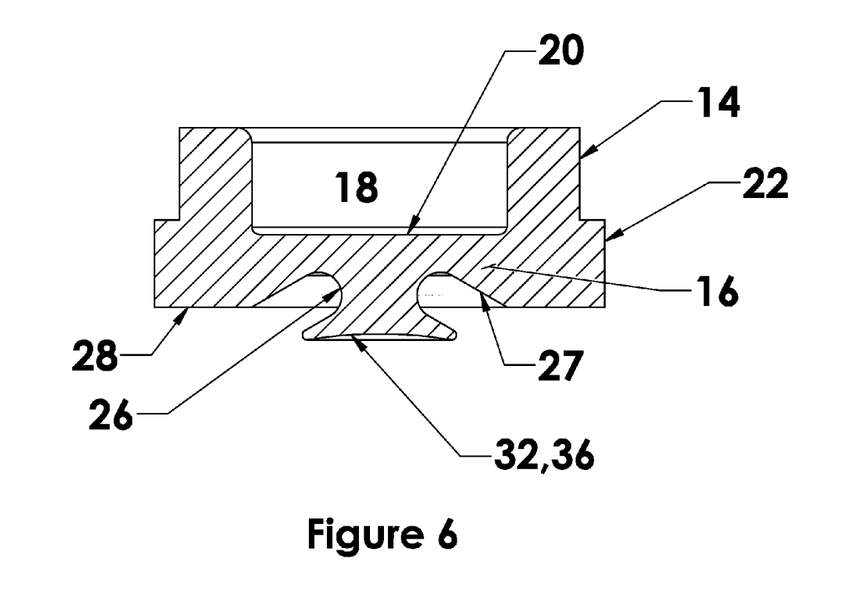
FIG. 6 shows a cross sectional view of the gauge assembly of FIG. 5 taken along lines 6-6 of FIG. 5.
Figure 7:
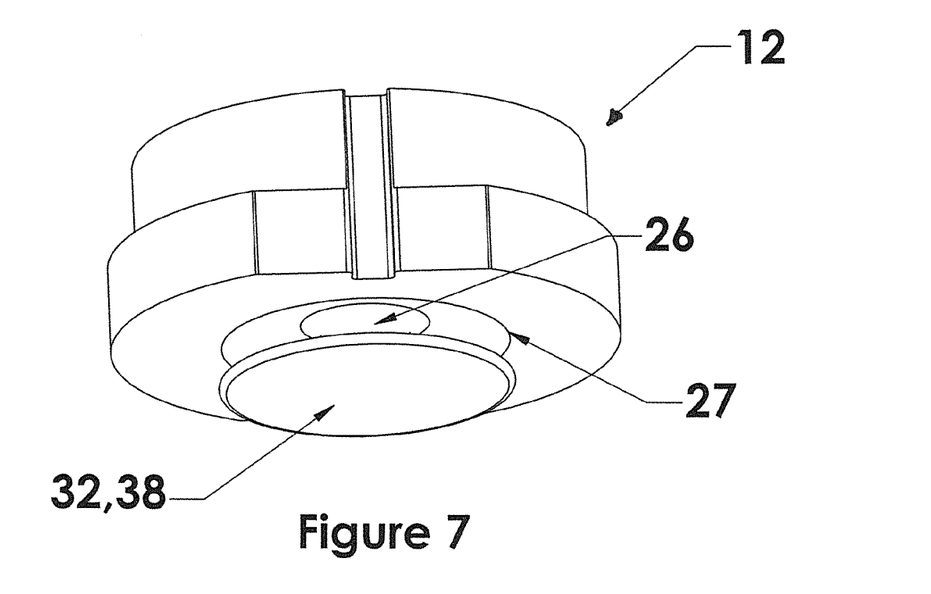
FIG. 7 shows an isometric view of the gauge assembly of FIG. 2, wherein the gauge assembly is provided with a mid-sized interface.
Figure 8:
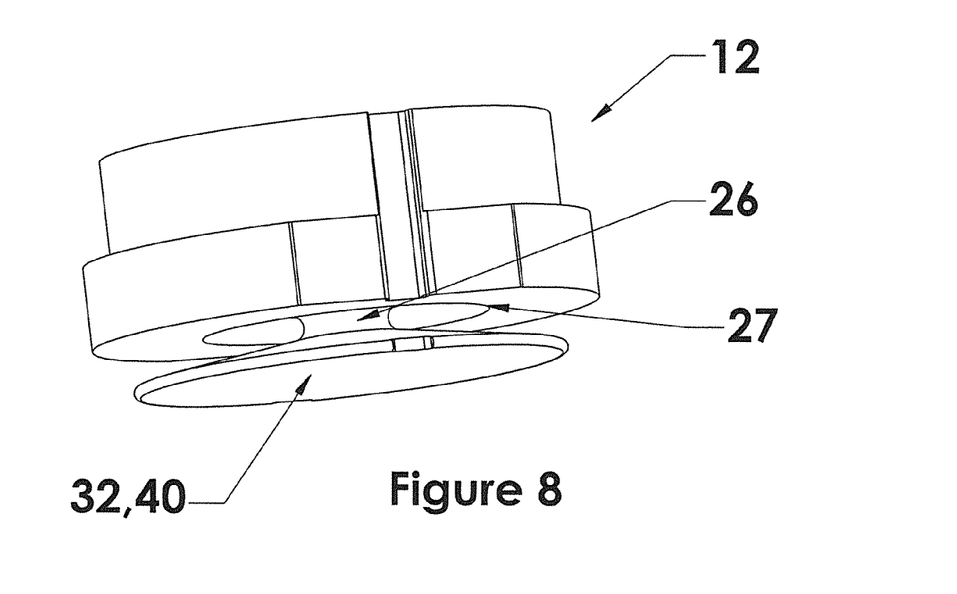
FIG. 8 shows an isometric view of the gauge assembly of FIG. 2, wherein the gauge assembly is provided with a large-sized interface.

Interface member 32 is affixed to a distal end of stem 26. Interface member 32 is provided for contacting an object, such as a ball or fruit or other material to be tested. Width 34 of interface member 32 may vary in size to accommodate different shapes of objects to be measured. For example, interface member 32 may be in the form of small member 36 (FIGS. 4-6), e.g. 1.5 to 1.7 inches, medium member 38 (FIG. 7), e.g., 2.5 to 3 inches, or large member 40 (FIG. 8), e.g., 9 to 10 inches. Additionally, a concavity of interface members 32 may be varied to accommodate different shapes of the objects to be measured.

Figure 12:
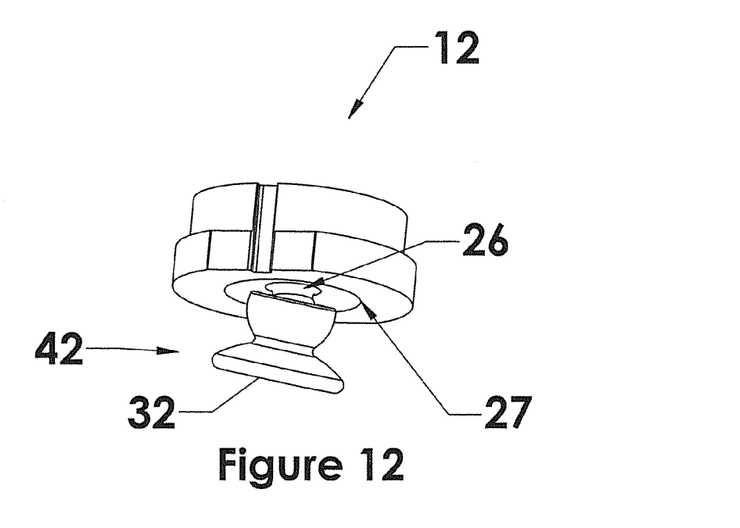
FIG. 12 shows an isometric view of an embodiment of the gauge assembly of the invention having toggle foot.
Figures 13, 14:
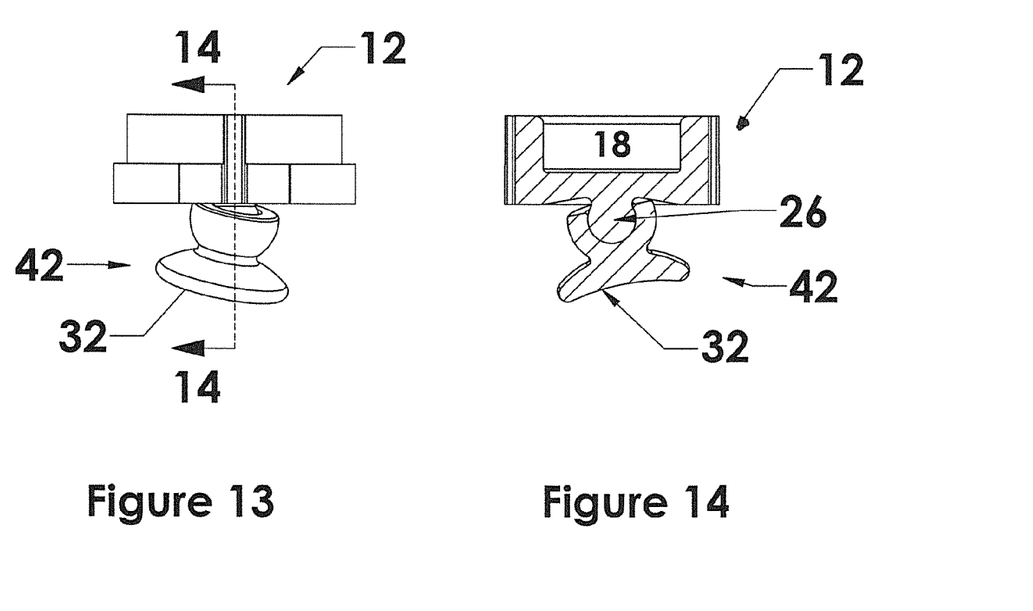
FIG. 13 shows an elevation view of the gauge assembly of FIG. 12.
FIG. 14 shows a cross sectional elevation view of the gauge assembly of FIG. 13, taken along lines 14-14 of FIG. 13.

In one embodiment, shown in FIGS. 12-14, interface member 32 is mounted on toggle foot 42 that is pivotally mounted on stem 26 for tracking a location of an object through the center of the object. Toggle foot 42 minimizes stress on gauge assembly 10 that may result from misalignment of the center of lower portion 16 and a center of the object to be measured. Toggle foot 42 allows for measurement of off-center or angled forces with accuracy.

As discussed above, the components received within cavity 18 may be the same regardless of the selected interface member 32 and configuration that is selected. The components received within cavity 18 include support member 44 (FIG. 2). Support member 44 has an upper surface 46 and a lower surface 48.

Figure 3:
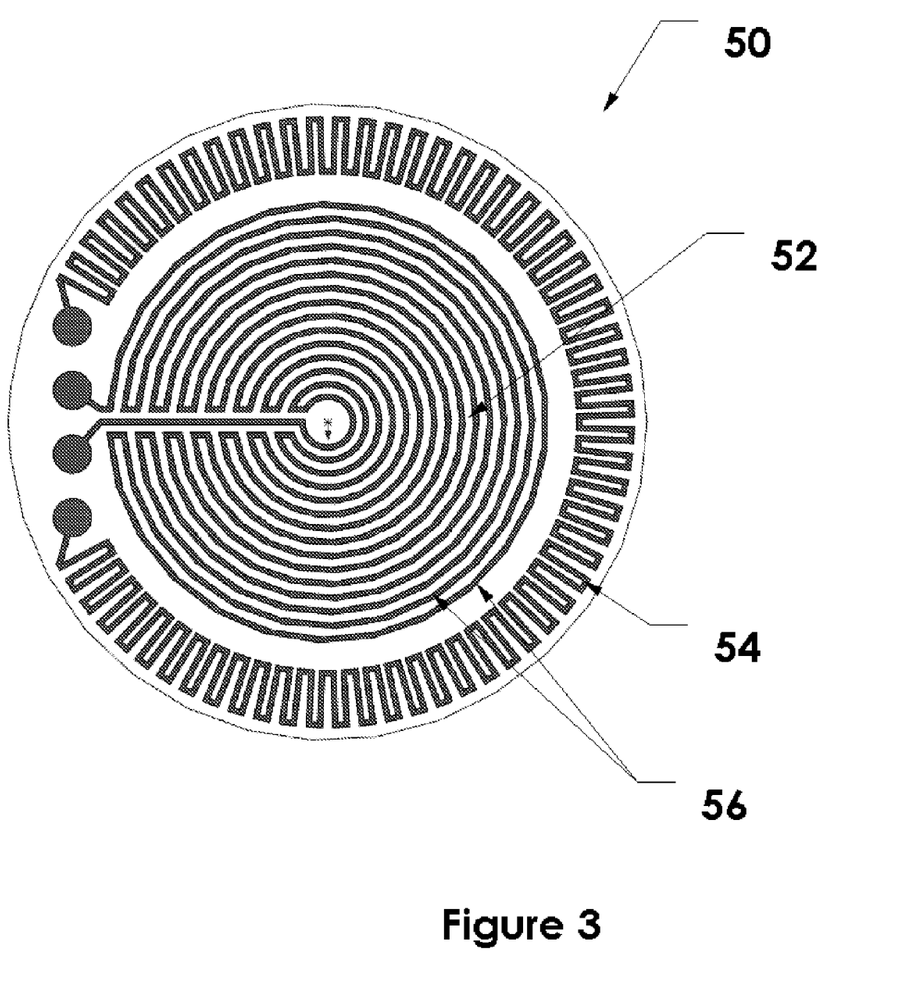
FIG. 3 shows an enlarged plan view of the diaphragm gauge of FIG. 2.

A strain gauge element 50, shown in greater detail in FIG. 3, is affixed to internal surface 20 of lower portion 16 of housing 12 within an adhesive. Strain gauge element 50 measures strain imparted to lower portion 16. Strain gauge element 50 is preferably a diaphragm strain gauge having a circle portion 52 and is surrounding outer portion 54. Preferably, the diaphragm strain gauge 10 of the invention has a configuration of traces, or ring segments 52, in the center of the strain gauge element 50 that resemble a set of concentric circle. The concentric circles in the center of strain gauge element 50 are what allow strain gauge assembly 10 to mechanically average off-center forces, as will be discussed below.

Outer portion 54 of strain gauge element 50 is preferably comprised of a zig-zag pattern. Circle portion 52 defines a plurality of ring segments 56 that form substantially complete circles. For example, in a preferred embodiment, ring segments 56 preferably traverse greater than 350 degrees. Ring segments 56 may be comprised of spirals, a double-back spiral pattern shown in FIG. 3, may overlap or may be arranged in other patterns that form at least substantially complete circles. In a preferred embodiment, a diameter of circle portion 52 comprises 60% to 70% of the diameter of strain gauge element 50. More preferably, a diameter of circle portion 52 comprises 60% of a diameter of strain gauge element 50.

Referring back to FIG. 2, interface circuit 58 is preferably affixed to upper surface 46 of support member 44 for electronic interface with strain gauge element 50. The electronics that amplify the extremely small amount of output of strain gauge element 50 are positioned inside strain gauge assembly 10, i.e., inside of cavity 18 defined by housing 12, thereby protecting the signal received from strain gauge element 50 from interference by other electronic devices.

Data processing components 60 are preferably provided on upper surface 46 of support member 44. Data processing components 60 are in electronic communication with interface circuit 58 for processing data collected from strain gauge element 50. Data processing components 60 are placed in close proximity to strain gauge element 50 to minimize electrical noise and interference.

Output conduit 62 is provided in communication with data processing component 60 for transmitting information from data processing component 60 to, for example, from data processing component 60 to an electronic output, such as a microprocessor or display of a device.

Potting compound 64 is received within cavity 18 for protecting and securing support member 44 and attached strain gauge element 50 therein.

Figure 9:
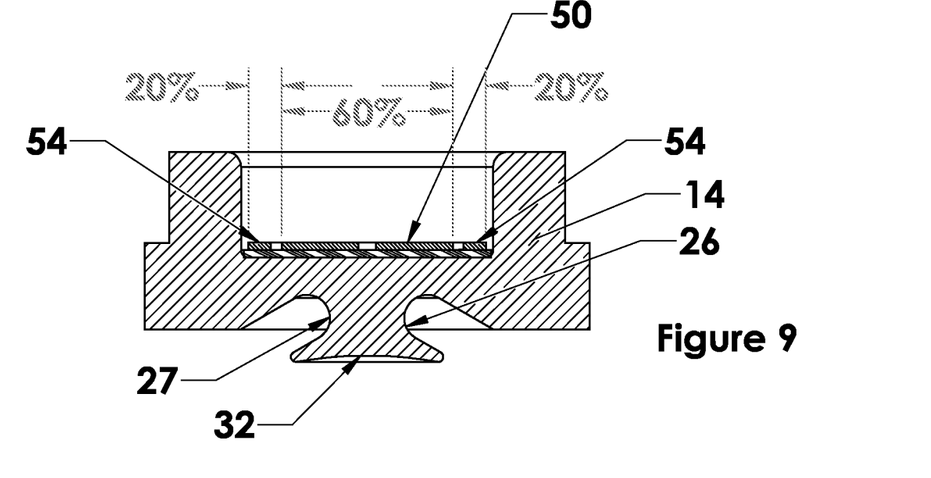
FIG. 9 shows a cross-sectional plan view of the gauge assembly of FIG. 2, 7 or 8.

Referring now to FIG. 9, in use, strain gauge element 50 of strain gauge assembly 10 is located on internal surface 20 of lower portion 16 of housing 12. Strain gauge element 50 has a circular portion 52 and surrounding outer portion 54. An appropriately sized interface member 32 is provided that is either integrated with stem 26 or is secured to stem 26 that extends from external surface 28 of lower portion 16 of housing 12. The object to be measured is located adjacent to interface member 32. The object may then be compressed so that interface member 32 and attached stem 26 apply a bending force to lower portion 16 of housing 12.

Figure 10:
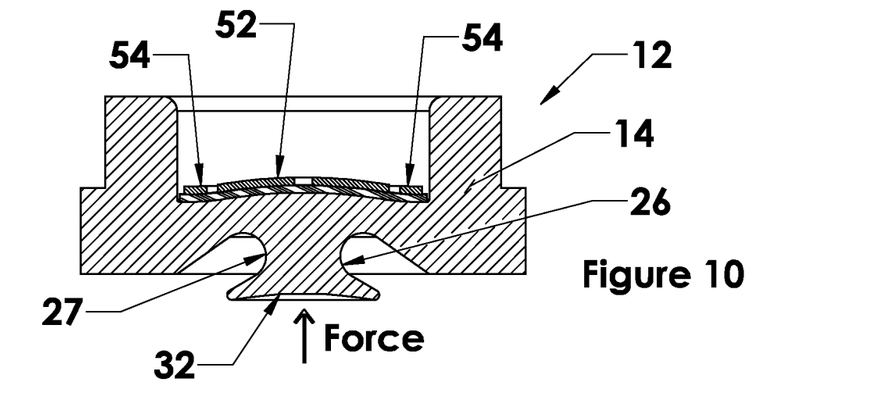
FIG. 10 shows a cross-sectional plan view of the gauge assembly of FIG. 2, 7 or 8, wherein the gauge assembly is subjected to a force F comprising a center load.

As shown in FIG. 10, when a force for compressing the object is centered on interface member 32, outer portion 54 of strain gauge element 50 is bent the same amount on opposite sides of strain gauge element 50 and circle portion 52 of strain gauge element 50 is deflected uniformly.

Figure 11:
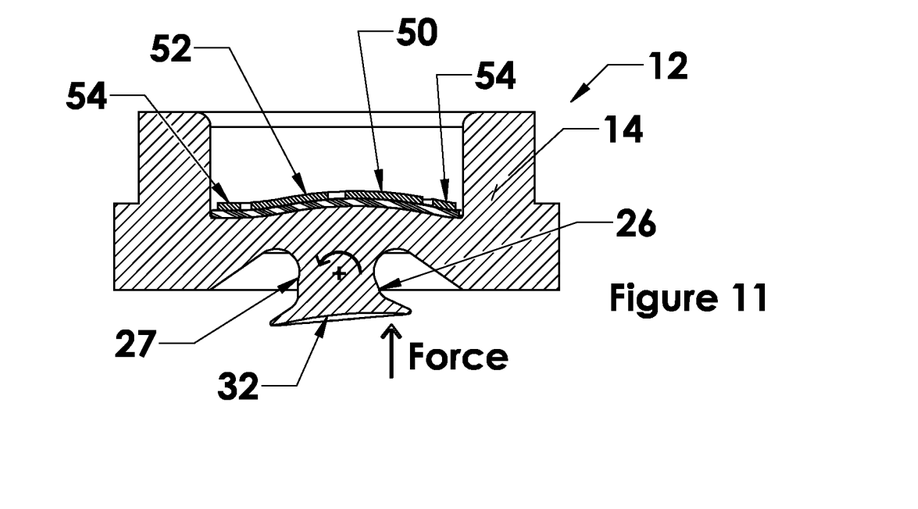
FIG. 11 shows a cross-sectional plan view of the gauge assembly of FIG. 2, 7 or 8, wherein the gauge assembly is subjected to a force F comprising an off-center load.

However, as shown in FIG. 11, when a force for compressing the object to be measured is delivered off center to interface member 32, lower portion 16 is distorted, wherein strain gauge element 50 experiences higher stress on a first side and lower stress on a second side. Due to the circular construction of strain gauge element 50, discussed above, the measured stresses effectively cancel one another to result in a mechanical averaging of deformation of ring segments 56 about the center of strain gauge element 50.

In greater detail, a standard strain gauge utilized by typical force gauge assemblies has a configuration that senses the strain of a round area of the strain gauge element changing shape when the strain gauge element is loaded in the center. Consequently, typical gauges must ensure that, during their use, energy is directed exactly to the center of the assembly. Typical gauges are, therefore, limited to a configuration that has a point on the front end of the gauge.

Force gauge assembly 10, of the invention, uses a diaphragm strain gauge in the bottom of the cup, i.e., affixed to internal surface 20 of lower portion 16 of housing 12. If forces applied lower portion 16 through the energy director, i.e., through annular recess 27, is off center by a small amount, there will be a slight twisting action instead of a direct force through the center of the bottom of the cup, i.e., through the center of lower portion 16 of housing 12.

The twisting action will generate an increased strain on one a first side of strain gauge element 50 and a lower strain on a second side of strain gauge element 50. The average strain applied to the strain gauge element 50 and to the bottom of the cup, i.e., to lower portion 16, will be the same as if the force were applied exactly in the center.

The mechanical action of averaging the strain will work to a certain degree well within the range of off-centeredness expected to be experienced a typical application, e.g., well within a user's expected ability to make sure a golf ball is centered within a measurement device employing strain gauge assembly 10 of the invention. In another example application, i.e., wherein strain gauge assembly 10 is used for measuring degradation of rubber used in shoes, the areas that get measured for spring rate may not be parallel. In this case, the force applied to strain gauge element 50 may not be directed through the center of strain gauge element 50. However, the force is mechanically averaged by the twisting action against diaphragm style strain gauge element 50 located in the in the bottom of the cup, i.e., affixed to internal surface 20 of lower portion 16.

Figure 15:
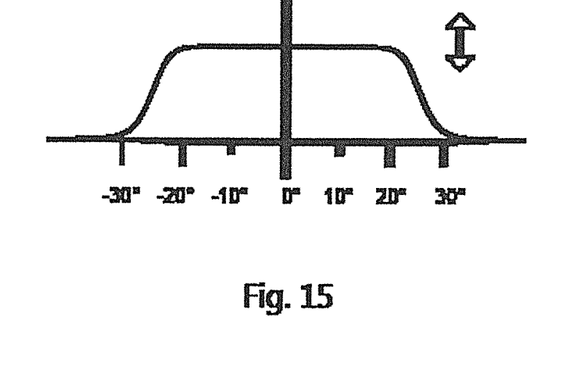
FIG. 15 shows a graphical representation of a force reading provided by the gauge assembly of FIGS. 12-14 over a range of force vectors angular offsets from vertical.

As shown in the example of FIG. 10, force F is delivered to stem 26 at an angle offset from perpendicular to lower portion 16. As a result of the stress canceling features described above, the resultant readings are accurate between a wide range of force application angles. In the graphical example shown in FIG. 15, it can be seen that the force data provided by strain gauge element 50 are consistent when the force vector is within approximately 25 degrees from normal. In the case of the application of an off centered force on a force gauge employing a typical strain gauge element, the force readings would only be accurate for the case where force is applied normal to the strain gauge element, wherein the measured force would decrease as the angle of application departed from normal. A force graph of such a device would resemble a sign wave, e.g., FIG. 1, wherein an accurate reading would be reflected by the peak of the sign wave and all other readings would be erroneous. In contrast, Applicant's device provides accurate readings over a wide range of force application angles, as is shown by FIG. 15.

Figure 16:
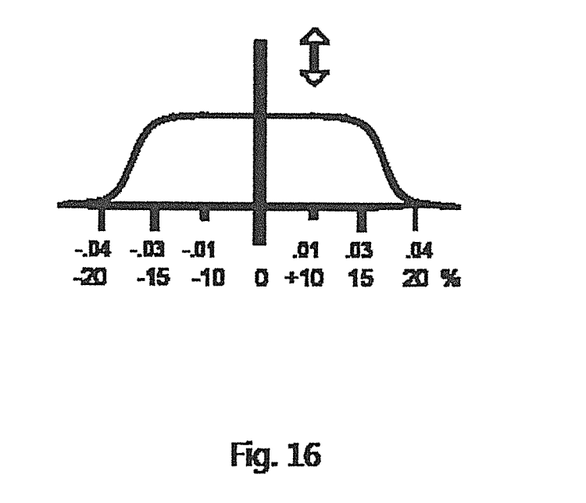
FIG. 16 shows a graphical representation of a force reading provided by the gauge assembly of FIG. 11 over a range of force vectors horizontal offsets from center.

Referring to FIG. 11, it can be seen that a similar phenomenon is seen when a normal force is applied off center to the interface member 32 of the invention. Due to the stress cancelling features discussed above, the resultant readings are accurate over a range of force application distances, e.g., from approximately 0.035 units to the left of center to approximately 0.035 units to the right of center in the example shown in FIG. 16.

Advantages of the strain gauge assembly 10 of the invention include low cost of manufacturing due to the consistency of components located within cavity 18. In particular, all assemblies are the same. The inside of the cup shape is always exactly the same. The configuration of the face of the gauge is whatever will be necessary to follow the shape of what will be measured. For example:

a. The golf ball compression meter has a dimple negation shape on the tip of the stem.
b. A shoe spring rate measurement device will use a toggle foot, applied in a similar manner to the use of a c-clamp.
c. The shape of an interface element for use in tomato gauge will be a larger diameter, e.g., a 1.25 inch radius to match the average diameter of a ripe tomato typically available in the grocery store.
d. The shape of an interface element for use in a potato gauge may be a flat surface of about ½ inch in diameter. With the mechanical averaging of the force within the gauge, the potato spring rate could still be measured without finding a parallel surface press against.
e. In the case of the skull gauge, a typical human skull will have a large surface area and a relatively unknown shape. The surface of the interface element could have three feet on spherical mounting to allow the feet to track the surface of the patient's skull and apply a uniform pressure to make a measurement.
f. A separate configuration may be used to enable the gauge of the invention to measure force of flex on trailer hitches and fishing rods.
g. In all cases, a primary difference between the various configurations of gauges is the shape of the interface element mounted on the stem.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A strain gauge assembly comprising:
a housing defining a cavity having a lower portion, said lower portion having an internal surface and an external surface;
a stem extending from said external surface of said lower portion;
an interface member on a distal end of said stem;
a strain gauge element affixed to said internal surface of said lower portion of said housing to allow said strain gauge element to measure strain imparted to said lower portion, wherein said strain gauge element has a circle portion that defines conductive ring segments that form at least substantially complete circles.

2. The strain gauge according to claim 1 further comprising:
a support member received within said cavity, said support member having an upper surface and a lower surface;
an interface circuit on said support member for electronic interface with said strain gauge element;
data processing components on said support member, said data processing components in electronic communication with said interface circuit for processing data collected from said strain gauge element;
wherein said data processing components are placed in close proximity to said strain gauge element to minimize electrical noise and interference.

3. The strain gauge according to claim 1 further comprising:
a support member received within said cavity, said support member having an upper surface and a lower surface;
an interface circuit on said support member for electronic interface with said strain gauge element;
data processing components on said support member, said data processing components in electronic communication with said interface circuit for processing data collected from said strain gauge element;
wherein said support member, said attached interface circuit and said data processing components comprise an internal assembly that may be used within a housing of different configurations.

4. The strain gauge according to claim 1 wherein:
said stem and said interface member are comprised of a unitary member.

5. The strain gauge according to claim 1 wherein:
said interface member is pivotally mounted on a distal end of said stem for delivering a force through said interface member to centralize a delivery of force to said strain gauge element.

6. The strain gauge according to claim 1 wherein:
said interface member is affixed to a toggle foot.

7. The strain gauge according to claim 1 wherein:
said ring segments of said circle portion of said strain gauge element traverse at least 350 degrees of a circle.

8. The strain gauge according to claim 7 wherein:
said ring segments of said circle portion form a spiral.

9. The strain gauge according to claim 1 wherein:
said strain gauge element comprises a conductive outer portion that surrounds said circle portion.

10. The strain gauge according to claim 9 wherein:
said outer portion is arranged in a circumferential zig-zag pattern.

11. The strain gauge according to claim 1 wherein:
a diameter of said circle portion comprises between 60 and 70 percent of a diameter of said strain gauge element.

12. The strain gauge according to claim 11 wherein:
said diameter of said circle portion comprises approximately 60% of said diameter of said strain gauge element.

13. A strain gauge assembly comprising:
a housing defining a cavity having a lower portion, said lower portion having an internal surface and an external surface;
a stem extending from said external surface of said lower portion;
an interface member on a distal end of said stem;
a swivel member between said stem and said interface member for facilitating engagement between said interface member and an object having a flat or non-flat surface for contact with said interface member;
wherein said stem, said swivel member, and said interface member deliver a force proximate to a central location of said lower portion;
a strain gauge element affixed to said internal surface of said lower portion of said housing to allow said strain gauge element to measure force imparted to said central location of said lower portion.

14. The strain gauge assembly according to claim 13 wherein:
said strain gauge element has a circle portion that defines conductive ring segments that form at least substantially complete circles.

15. The strain gauge according to claim 14 wherein:
said ring segments of said circle portion of said strain gauge element traverse at least 350 degrees of a circle.

16. The strain gauge according to claim 15 wherein:
said ring segments of said circle portion form a spiral.

17. The strain gauge according to claim 14 wherein:
said strain gauge element comprises a conductive outer portion that surrounds said circle portion.

18. The strain gauge according to claim 17 wherein:
said outer portion is arranged in a circumferential zig-zag pattern.

19. The strain gauge according to claim 14 wherein:
a diameter of said circle portion comprises between 60 and 70 percent of a diameter of said strain gauge element.

20. The strain gauge according to claim 19 wherein:
said diameter of said circle portion comprises approximately 60% of said diameter of said strain gauge element.

21. The strain gauge according to claim 13 further comprising:
a support member received within said cavity, said support member having an upper surface and a lower surface;
an interface circuit on said support member for electronic interface with said strain gauge element;
data processing components on said support member, said data processing components in electronic communication with said interface circuit for processing data collected from said strain gauge element;
wherein said data processing components are placed in close proximity to said strain gauge element to minimize electrical noise and interference.

22. The strain gauge according to claim 13 further comprising:
a support member received within said cavity, said support member having an upper surface and a lower surface;
an interface circuit on said support member for electronic interface with said strain gauge element;
data processing components on said support member, said data processing components in electronic communication with said interface circuit for processing data collected from said strain gauge element;
wherein said support member, said attached interface circuit and said data processing components comprise an internal assembly that may be used within a housing of different configurations.

23. The strain gauge according to claim 13 wherein:
said stem and said interface member are comprised of a unitary member.

24. The strain gauge according to claim 13 wherein:
said interface member is pivotally mounted on a distal end of said stem for delivering a force through a pivoting member to centralize a delivery of force to said strain gauge element.

25. The strain gauge according to claim 24 wherein:
said pivoting member is a toggle foot.

26. A method of measuring strain of a compressed object comprising the steps of:
locating a diaphragm strain gauge element on an interior surface of a lower portion of a housing, said strain gauge element having a conductive circular portion;
selecting an appropriately sized interface element for securing to a stem extending from an external surface of said lower portion of said housing;
locating the object adjacent to said interface element;
compressing said object so that said interface element and attached stem bend said lower portion of said housing.

27. The method according to claim 26 wherein:
said step of compressing delivers a force at an angle with respect to said lower portion, resulting in deformation of said lower portion;
said deformation results in a first side of said strain gauge element experiencing a first stress and a second side of said strain gauge element experiencing a second stress;
wherein said first stress and said second stress mechanically average a deformation of conductive rings segments about a center of said strain gauge element resulting in an averaged signal from said strain gauge element.

28. The method according to claim 26 wherein:
said step of compressing delivers a force at an offset with respect to a center of said strain gauge element mounted on said lower portion, resulting in deformation of said lower portion;
said deformation results in a first side of said strain gauge element experiencing a first stress and a second side of said strain gauge element experiencing a second stress;
wherein said first stress and said second stress mechanically average a deformation of conductive ring segments about a center of said strain gauge element resulting in an averaged signal from said strain gauge element.

* * * * *

UNITED STATES PATENT AND TRADEMARK OFFICE
CERTIFICATE OF CORRECTION

| | | |
|---|---|---|
| PATENT NO. | : 9,121,781 B2 | Page 1 of 1 |
| APPLICATION NO. | : 13/852858 | |
| DATED | : September 1, 2015 | |
| INVENTOR(S) | : Niemeyer, III | |

It is certified that error appears in the above-identified patent and that said Letters Patent is hereby corrected as shown below:

On the title page of the patent, in item (72), please replace "OH" with --OR--.

Signed and Sealed this
Twenty-eighth Day of June, 2016

Michelle K. Lee
*Director of the United States Patent and Trademark Office*